(12) United States Patent
Kelkar et al.

(10) Patent No.: US 12,314,766 B2
(45) Date of Patent: *May 27, 2025

(54) HARDWARE ACCELERATOR SERVICE DISCOVERY

(71) Applicant: Google LLC, Mountain View, CA (US)

(72) Inventors: Shrikant Kelkar, San Jose, CA (US); Lakshmi Sharma, Saratoga, CA (US); Manoj Jayadevan, Cupertino, CA (US); Gargi Adhav, San Jose, CA (US); Parveen Patel, Cupertino, CA (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,072

(22) Filed: Nov. 21, 2023

(65) Prior Publication Data

US 2024/0086247 A1 Mar. 14, 2024

Related U.S. Application Data

(63) Continuation of application No. 17/351,849, filed on Jun. 18, 2021, now Pat. No. 11,861,408.

(51) Int. Cl.
 *G06F 9/46* (2006.01)
 *G06F 9/48* (2006.01)
 *G06F 9/50* (2006.01)

(52) U.S. Cl.
 CPC .......... *G06F 9/5044* (2013.01); *G06F 9/4881* (2013.01); *G06F 9/505* (2013.01); *G06F 9/5061* (2013.01)

(58) Field of Classification Search
 CPC ...... G06F 9/5044; G06F 9/4881; G06F 9/505; G06F 9/5061
 See application file for complete search history.

(56) References Cited

U.S. PATENT DOCUMENTS

| | | |
|---|---|---|
| 6,633,898 B1 | 10/2003 | Seguchi et al. |
| 10,102,035 B2 | 10/2018 | Bartfai-Walcott et al. |
| 10,175,991 B2 | 1/2019 | Biran et al. |
| 10,324,873 B2 | 6/2019 | Kaushik et al. |
| 10,365,830 B2 | 7/2019 | He et al. |
| 11,321,907 B1 | 5/2022 | Dagani et al. |

(Continued)

FOREIGN PATENT DOCUMENTS

| | | |
|---|---|---|
| EP | 3731091 A1 | 10/2020 |
| JP | 2021528740 A | 10/2021 |

OTHER PUBLICATIONS

Extended European Search Report for European Patent Application No. 22156098.0 dated Aug. 23, 2022. 8 pages.

(Continued)

*Primary Examiner* — Gregory A Kessler
(74) *Attorney, Agent, or Firm* — Lerner David LLP (57) ABSTRACT

The present disclosure includes systems, methods, and computer-readable mediums for discovering capabilities of a hardware (HW) accelerator card. A processor may communicate a request for a listing of acceleration services to a HW accelerator card connected to the processor via the communication interface. The HW accelerator card may retrieve the listing from memory and provide a response to the processor that includes a listing of the HW acceleration services provided by the HW accelerator card.

17 Claims, 5 Drawing Sheets

(56) References Cited

U.S. PATENT DOCUMENTS

| | | |
|---|---|---|
| 2011/0320739 A1 | 12/2011 | Ragunathan et al. |
| 2018/0307499 A1 | 10/2018 | Chen et al. |
| 2019/0004871 A1 | 1/2019 | Sukhomlinov et al. |
| 2020/0026575 A1 | 1/2020 | Guim Bernat et al. |
| 2020/0028921 A1 | 1/2020 | Cai et al. |
| 2020/0142753 A1 | 5/2020 | Harwood et al. |
| 2020/0177481 A1 | 6/2020 | Venkatesh et al. |
| 2020/0218684 A1 | 7/2020 | Sen et al. |
| 2020/0341810 A1 | 10/2020 | Ranganathan et al. |

OTHER PUBLICATIONS

International Search Report and Written Opinion for International Application No. PCT/US2022/047988 dated Jan. 30, 2023. 13 pages.

Notice of Grant for Japanese Patent Application No. 2023-572177 dated Feb. 4, 2025. 3 pages.

HARDWARE ACCELERATOR SERVICE DISCOVERY

CROSS-REFERENCE TO RELATED APPLICATION

The present application is a continuation of U.S. application Ser. No. 17/351,849, filed on Jun. 18, 2021, the disclosure of which is incorporated herein by reference.

BACKGROUND

In most systems, it is difficult for a computing device, including the components of the computing device and/or the software executing on the computing device, including the operating system, to discover the functionality and capabilities provided by hardware accelerator cards connected to the computing device by a communication interface, such as a PCIe bus. To avoid these issues, processors may be hardcoded with software, such as drivers, to communicate with particular hardware accelerator cards. However, hardcoding processors with the necessary software to communicate with particular hardware accelerator cards limit the processors to only those particular hardware accelerator cards. Thus, processors are not able to leverage the functions and capabilities of other hardware accelerator cards or hardware accelerator cards that were developed after the processor was produced.

Additionally, some hardware accelerator cards may expose their functionalities and capabilities as separate devices within the operating system of a computing device. In this regard, when a hardware accelerator card is connected to a computing device by a communication interface, such as a PCIe bus, the operating system may detect or otherwise be notified of the connection and list each function and capability of the hardware accelerator card as discrete devices within the operating system according to predefined classes and subclasses. Based on the devices listed in the operating system, the computing device may be able to use the capabilities and functionalities of the hardware accelerator card.

As the capabilities and functionalities of hardware accelerator cards have increased and become more specialized, these new capabilities and functionalities are not clearly identified by the classes and subclasses provided for by current operating systems. Thus, some operating systems may provide an indication of the capabilities and functionalities provided by hardware accelerator cards, but may not be able to identify all of the capabilities and functionalities of the hardware accelerator cards. Further, some of the capabilities and functionalities of the hardware accelerator cards may not be recognized and/or clearly identified within the operating systems. As such, computing devices may not be able to leverage or even be made aware of all of the features and capabilities of available hardware accelerator cards.

BRIEF SUMMARY

The technology described herein relates to systems and methods for discovering hardware acceleration services provided by hardware (HW) accelerators connected to a computing device via a communication interface.

One aspect of the disclosure relates to a method for discovering the functions and capabilities of a hardware (HW) accelerator card. The method may include requesting, by the one or more processors via a communication interface, a listing of acceleration services from the HW accelerator card; and receiving, by the one or more processors via the communication interface, the listing of acceleration services from the HW accelerator card, wherein the listing of acceleration services is stored within the HW accelerator card.

Another aspect of the disclosure relates to a system including a communication interface, a hardware (HW) accelerator card comprising one or more accelerators and a first memory storing a listing of acceleration services provided by the one or more accelerators, and a processor, in communication with the HW accelerator card via the communication interface. The processor may be configured to request, via the communication interface, the listing of acceleration services from the HW accelerator card and receive, via the communication interface, the listing of acceleration services from the HW accelerator card.

Another aspect of the disclosure relates to a non-transitory, tangible computer-readable storage medium on which computer-readable instructions of a program are stored, the instructions, when executed by one or more computing devices, cause the one or more computing devices to perform a method. The method may include requesting, via a communication interface, a listing of acceleration services from the HW accelerator card and receiving, via the communication interface, the listing of acceleration services from the HW accelerator card, wherein the listing of acceleration services is stored within the HW accelerator card.

In some instances, a workload instruction may be transmitted to the HW accelerator card. The workload instructions may define a workload for processing by the HW accelerator card that uses one or more of the acceleration services in the listing of acceleration services.

In some instances, status updates may be requested from the HW accelerator card during the processing of the workload by the HW accelerator card.

In some instances, prior to requesting the listing of acceleration services, a handle to a hardware (HW) accelerator card may be requested. The request for the listing of acceleration services from the HW accelerator card may be sent using the handle.

In some examples, the handle may be closed after receiving a status update indicating completion of the workload instructions.

In some instances, the listing of acceleration services includes functions and/or capabilities of accelerators on the HW accelerator.

In some examples, a processor of the HW accelerator may retrieve the listing of acceleration services from memory of the HW accelerator in response to receiving the request from the one or more processors.

DETAILED DESCRIPTION

The technology is directed to discovering hardware acceleration services provided by hardware (HW) accelerator cards connected to a computing device via communication interfaces. In this regard, a processor may communicate a request for a listing of the functions and capabilities of the HW accelerator card connected to the computing device via the communication interface. A listing of the functions and capabilities of the HW accelerator card, hereinafter referred to as "acceleration services," may be stored in the memory of the HW accelerator card. In response to receiving the request from the processor, the HW accelerator card may retrieve the listing from memory and provide a response to the processor that includes a listing of the HW acceleration services provided by the HW accelerator card.

To overcome the deficiencies of discovering acceleration services the technology described herein uses a standardized listing of identifiers that correspond to acceleration services that can be provided by the accelerators on HW accelerator cards. In this regard, each HW accelerator card may store a listing of identifiers that correspond to the acceleration services provided by the accelerators on that card. As the identifiers can provide more granularity than the device classes and subclasses currently used, processors which retrieve the listings from the HW accelerator cards will be able to determine and leverage more accelerator services offered by the accelerators on the HW accelerator cards.

As used herein, the term "acceleration services" refers to the capabilities and functionalities offered by accelerators of a HW accelerator card. References to "acceleration services" of a HW accelerator card refers to the acceleration services of the accelerators on that HW accelerator card. Acceleration services may include capabilities and functionalities that an accelerator can leverage to control the processing of data, referred to herein as control-plane acceleration services. Acceleration services may also include capabilities and functionalities that an accelerator can leverage to process the data, referred to herein as data-plane acceleration services. For example, an accelerator can support acceleration services that provide controls and/or policies for sharing memory between memory on the host (the computing device) and the accelerator. This control-plane acceleration service can be identified and communicated as an acceleration service.

As each HW accelerator card may have many accelerators, each HW accelerator may provide many acceleration services having the same and/or different capabilities and functionalities. Further, each accelerator may include more than one function and capability.

Example Systems

Figure 1:
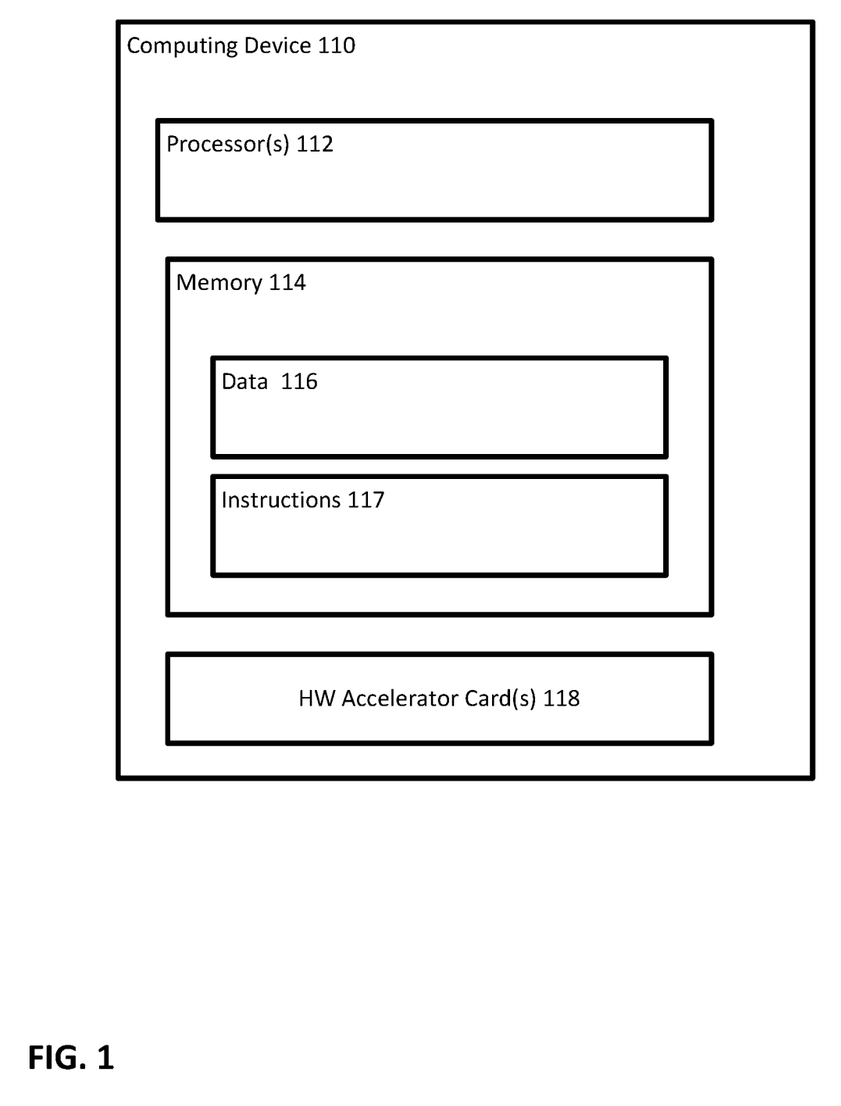
FIG. 1 is an illustration of an example system in accordance with aspects of the present disclosure.

FIG. 1 depicts an example architecture of a computing device 110 in which the features described herein may be implemented. This example should not be considered as limiting the scope of the disclosure or usefulness of the features described herein. Computing device 110 may be a server, personal computer, or other such systems. The architecture of the computing device 110 includes a processor 112, memory 114, and a hardware accelerator card 118.

The processor 112 may include one or more general purpose processors, such as a Central Processing Unit (CPU), and/or one or more special purpose processors, such as application specific integrated circuits (ASICs), field programmable gate arrays (FPGAs), etc. The processor 112 may be of any type including but not limited to one or more microprocessor (uP), one or more microcontroller (uC), one or more digital signal processor (DSP), or any combination thereof. The processor may include one or more levels of caching, one or more processor cores, and one or more registers. Each processor core may include an arithmetic logic unit (ALU), a floating point unit (FPU), a digital signal processing core (DSP Core), or any combination thereof. The processor 112 may be configured to execute computer-readable program instructions that may be contained in a data storage, such as instruction 117 stored in memory 114, and/or other instructions as described herein.

The memory 114 can store information accessible by the processor 112, including instructions 117 that can be executed by the processor 112. Memory can also include data 116 that can be retrieved, manipulated, or stored by the processor 112. The memory 114 may be a type of non-transitory computer readable medium capable of storing information accessible by the processor 112, such as a hard-drive, solid state drive, tape drive, optical storage, memory card, ROM, RAM, DVD, CD-ROM, write-capable, and read-only memories.

The instructions 117 can be a set of instructions executed directly, such as machine code, or indirectly, such as scripts, by the processor 112. In this regard, the terms "instructions," "steps," and "programs" can be used interchangeably herein. The instructions 117 can be stored in object code format for direct processing by the processor 112, or other types of computer language including scripts or collections of independent source code modules that are interpreted on demand or compiled in advance.

The data 116 can be retrieved, stored, or modified by the processor 112 in accordance with the instructions 117 or other such instructions. For instance, although the system and method are not limited by a particular data structure, the data 116 can be stored in computer registers, in a distributed storage system as a structure having a plurality of different fields and records, or documents, or buffers. The data 116 can also be formatted in a computer-readable format such as, but not limited to, binary values, ASCII or Unicode. Moreover, the data 116 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 112 and memory 114 as being within the same block, the processor 112 and memory 114 may actually include multiple processors and memories that may or may not be stored within the same physical housing. For example, some of the instructions 117 and data 116 can be stored on a removable CD-ROM and others within a read-only DRAM chip. Some or all of the instructions and data can be stored in a location physically remote from, yet still accessible by, the processor 112. Although FIG. 1 illustrates computing device 110 as including only one processor 112, memory, 114, and HW accelerator card 118, the computing device 110 may include any number of processors, memory, and HW accelerator cards. Similarly, the processor 120 can actually include a collection of processors, which may or may not operate in parallel.

The computing device may further include a hardware (HW) accelerator card 118. The hardware accelerator card 118 may be any device configured to efficiently process particular types of tasks. Some examples of HW accelerator cards include network accelerator cards, video transcoding accelerator cards, security function accelerator cards, cryptography accelerator cards, sound processing accelerator cards, artificial intelligence accelerator cards, etc. Each of these HW accelerator cards may be configured to provide particular acceleration services such as compression, encryption, transcoding, hash generation, graphic processing, simulation, etc. Some HW accelerator cards may be configured to provide multiple acceleration services such as compression and encryption, or any other combination of acceleration services.

Figure 2:
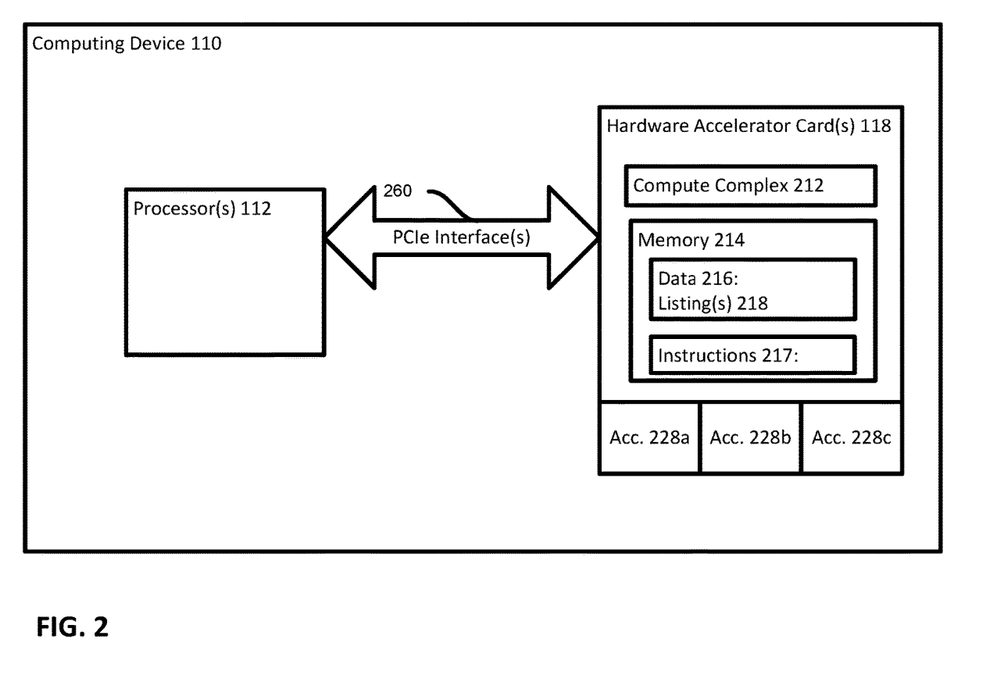
FIG. 2 is another illustration of an example system in accordance with aspects of the present disclosure.

Referring to FIG. 2, the HW accelerator card may include a compute complex 212, memory 214, and accelerators 228a, 228b, and 228c. The compute complex may be comprised of one or more processors. The one or more processors may control the general operation of the other components of the hardware accelerator, such as by distributing processing tasks amongst the accelerators 228a-228c and communicating with other devices in the computing device 110, such as processor 112. The one or more processors of the compute complex 212 may be comprised of one or more general purpose processors and/or special purpose processors. Typically, the compute complex of a hardware accelerator card is comprised of one or more special purpose processors, such as application specific integrated circuits (ASICs), field programmable gate arrays (FPGAs), etc., capable of executing ARM-based instruction sets, although other instruction sets may be used.

The accelerators 228a-228c may each be comprised of one or more processors capable of providing particular acceleration services. For example, each accelerator may be configured to provide particular acceleration services such as compression, encryption, transcoding, hash generation, graphic processing, simulation, etc. Some HW accelerator cards may be configured to provide multiple acceleration services such as compression and encryption, or any other combination of acceleration services. The one or more processors of the accelerators may be one or more special purpose processors, such as application specific integrated circuits (ASICs), field programmable gate arrays (FPGAs), specialized processors, etc. used. Although three accelerators are illustrated in FIG. 2, including accelerators 228a-228c, HW accelerator cards may include any number of accelerators. As previously explained, each individual accelerator may be configured to provide more than one acceleration service (e.g., more than one function and/or capability).

Referring again to FIG. 2, the HW accelerator card includes memory 214. The memory 214 may be compared to memory 114 in that it may be any type of non-transitory computer readable medium capable of storing information accessible by the processor 120, such as a hard-drive, solid state drive, tape drive, optical storage, memory card, ROM, RAM, DVD, CD-ROM, write-capable, and read-only memories. Memory 214 may store information accessible by the compute complex 212 and/or accelerators 228a-228c, including instructions 217 that can be executed by the compute complex 212 and/or accelerators 228a-228c. Although not shown, each accelerator 228-228c may have its own memory and/or a pool of shared memory for storing data and instructions for execution of tasks assigned by the compute complex 212.

The data 216 within memory 214 can be retrieved, stored or modified by the compute complex 212 and/or accelerators 228a-228c in accordance with the instructions 217 or other such instructions. As further illustrated in FIG. 2, the data 216 may include one or more accelerations service listing 218. The acceleration service listing 218 may contain a list of the acceleration services provided by each accelerator 228a-228c.

The listings of acceleration services may be in a standardized form. In this regard, each particular acceleration service may be assigned a particular, unique identifier. All accelerators that have a certain acceleration service would include the unique identifier associated with that certain acceleration service in the listing of acceleration services.

Figure 3:
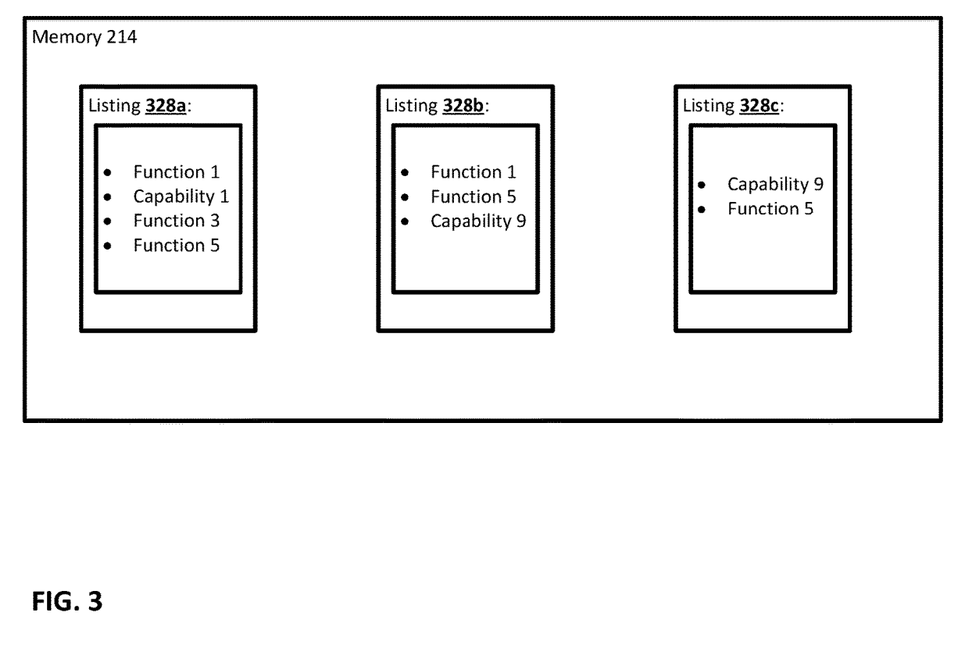
FIG. 3 is an illustration of an example listing of acceleration services in accordance with aspects of the present disclosure.

FIG. 3 illustrates example listings 328a-328c which correspond to accelerators 228a-228c, respectively, as stored within memory 214. In this regard, memory 214 includes a listing for each accelerator on the HW accelerator card 118. As illustrated, listing 328a identifies the acceleration services provided by accelerator 228a, as identified by unique identifiers including Function 1, Capability 1, Function 3, and Function 5. Similarly, accelerator 228b is capable of providing three acceleration services, and each acceleration service is identified within listing 328b by its unique identifier, including Function 1, Function 5, and Capability 9. Accelerator 228c is capable of providing two acceleration services. Each of these two acceleration services is identified in listing 328c by unique identifiers including Capability 9 and Function 5.

As further illustrated in FIG. 3, accelerators that provide a common acceleration service may be associated with the same unique identifier in their respective listings. For instance, Function 1 is the unique identifier associated with a particular function capable of being performed by accelerators 228a and 228b. Thus, listings 328a and 328b contain the same unique identifier Function 1. Similarly, Capability 9 is the unique identifier associated with a particular capability of accelerators 228b and 228c. Thus, listings 328b and 32c contain the same unique identifier of Capability 9. The unique identifiers in FIG. 3 are merely examples of possible identifiers. Identifiers may include any value or other such indicator, including numbers, letters, symbols, etc.

The listings 328a-328c are examples of a possible format for listing unique identifiers associated with accelerators of the HW accelerator card 118. In some examples, the listings of accelerators may be stored in a combined listing, such as a spreadsheet or database. For example, the combined listing may identify each accelerator and the unique identifiers associated with the acceleration services provided by that accelerator. Similarly, the listing may be grouped according to accelerators. For instance, a first listing may include a combined listing for a first set of accelerators and a second listing may include a combined listing for a second set of accelerators. Other data may also be included in the listings. Although FIGS. 2 and 3 illustrate the listings as being stored on memory 216, the listings may be stored on the memory of one or more accelerators.

Although not illustrated, a manager may maintain a repository of acceleration services and associated unique identifiers for the acceleration services. The manager may be an individual(s), a company, a collection of companies, a standards organization(s), etc. In addition to maintaining the repository, the manager may also assign the unique identifiers to each acceleration service and add additional acceleration services and corresponding unique identifiers when developed, received, or otherwise requested. By providing a repository of acceleration services and associated unique identifiers, the identifiers used to indicate acceleration services may be consistent across HW accelerator cards, even when the HW accelerator cards are manufactured by different vendors.

Referring to FIG. 2, the processor 112 may communicate directly with the hardware accelerator card 118 using a communication interface and protocol. For example, the processor(s) 112 may communicate with the hardware accelerator card(s) using PCIe interface 260. Although FIG. 2 illustrates a PCIe interface 260, other communication interfaces and protocols may be used. For example, the processor(s) 112 may communicate with the HW accelerator card(s) 118 using one or more of a CAN interface and protocol, an SPI interface and protocol, a USB interface and protocol, an eSPI interface and protocol, an Ethernet interface and protocol, an IDE interface and protocol, or any other such interface and protocol.

Communication between devices over the communication interface, such as processor 112 and HW accelerator card 118 over PCIe interface 260 may be controlled via an operating system executing on the computing device 110. In this regard, the operating system may setup a handle to provide a communication channel between devices attached to the PCIe interface 260. In some instances, the operating system may also close communication channels between different devices connected to the PCIe interface 260.

Although not shown in FIGS. 1 and 2, the computing device 110 may include other components normally found in a personal computer and/or server such as a display device, for example, a monitor having a screen, a projector, a touch-screen, a small LCD screen, a television, or another device such as an electrical device that can be operable to display information processed by processor 112. Computing device 110 may also include speakers, network interface devices, such as one or more modems and/or network interface cards. Computing device 110 may also include one or more user input devices, such as a mouse, keyboard, touch screen, microphone, etc. The computing device 110 may also include hardware for connecting some or all of the aforementioned components together with one another.

Example Methods

Figure 4:
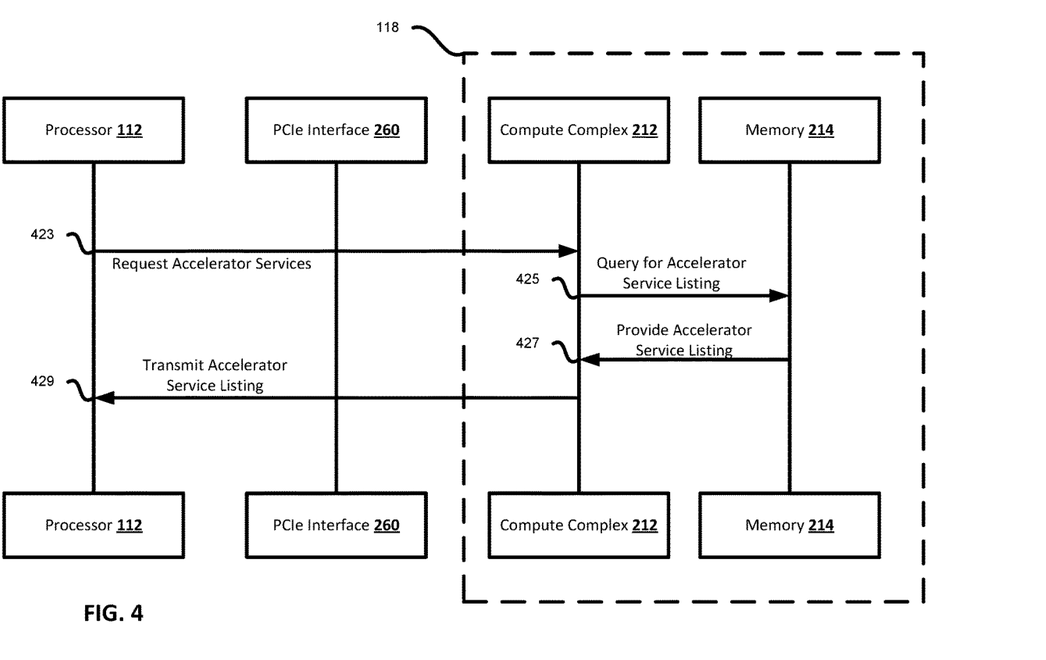
FIG. 4 is a flow diagram of an example process for requesting acceleration services from a hardware accelerator card in accordance with aspects of the disclosure.

FIG. 4 is a flow diagram illustrating the process of discovering acceleration services provided by a HW accelerator card, such as HW accelerator card 118 connected to a processor, such as processor 112 via a communication interface, such as PCIe bus 260. The processor 112 may request to communicate with the HW accelerator card 118 (shown in dashed line) via the PCIe interface. The operating system executing on the computing device may provide a communication channel over the PCIe bus between the HW accelerator card and processor 112.

Using the communication channel, the processor 112 may transmit a request a listing of acceleration services provided by the accelerators on the HW accelerator card 118, as shown by line 423. In response to receiving the request from the processor 118, the compute complex 212 of the HW accelerator card 118 may query and receive a listing of acceleration services from memory 214 of the HW accelerator card (or memory of the accelerators), as illustrated by arrows 425 and 427, respectively. In this regard, the HW accelerator card may aggregate the acceleration services of all accelerators. In certain instances, the HW accelerator card 118 may query only some accelerators.

In some instances, the HW accelerator card 118 may aggregate the acceleration services of the accelerators in a hierarchical manner. In this regard, acceleration services may be hierarchical, in that one acceleration service may rely on or be dependent on another acceleration service. This hierarchical relationship between acceleration services may be identified and stored in this listing. In some instances, each level in the hierarchical relationship may identify the capabilities and functionalities of the levels underneath.

The compute complex 212 may provide the listing of acceleration services to the processor 112 via the PCIe bus 260, as shown by line 429. Once the processor receives the listing of acceleration services the communication channel may be closed.

Figure 5:
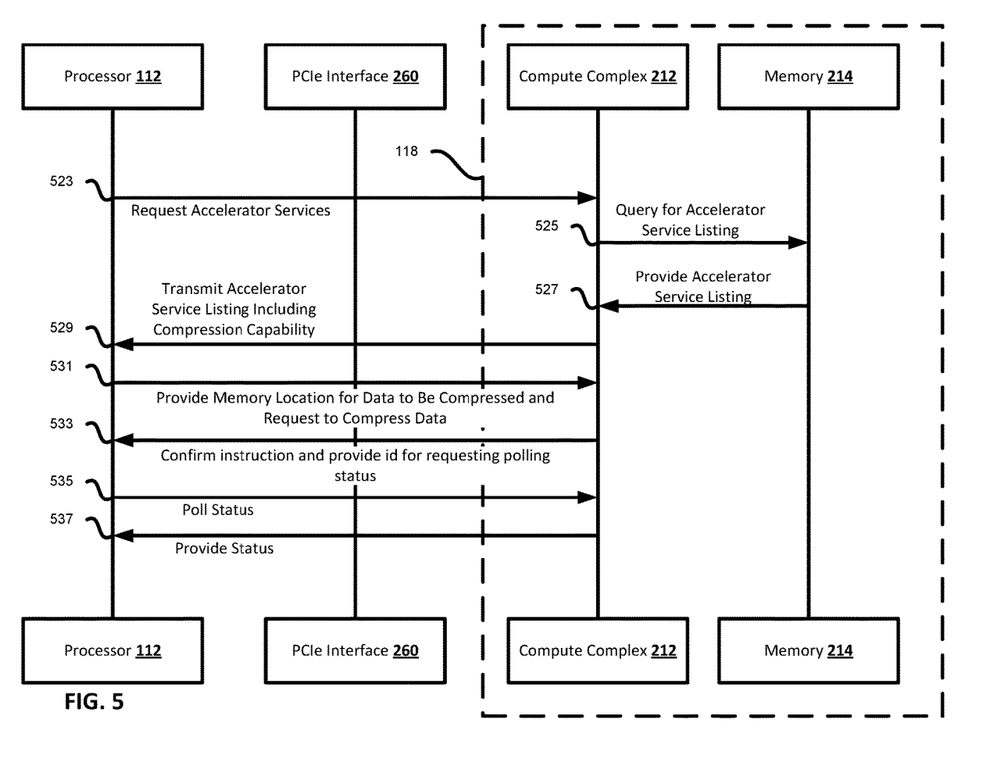
FIG. 5 is another flow diagram of an example process for requesting acceleration services from a hardware accelerator card and providing a workload to leverage the acceleration services in accordance with aspects of the disclosure.

In the event the processor can leverage one or more acceleration services, the processor 112 may request the HW accelerator card complete one or more tasks using one of the provided acceleration services offered by the accelerators on the HW accelerator card 118. FIG. 5 illustrates a processor 112 requesting information regarding the acceleration services of a HW accelerator card 118 connected via PCIe bus 260. In this regard, steps 521-529 correspond to steps 421-429 described above.

As illustrated by arrow 529, the HW accelerator indicates that it is capable of providing compression services. Upon receiving the acceleration services, the processor 112 may provide a workload instruction including an indication of a location storing data and an instruction to the HW accelerator card 118 to compress the data, as shown by arrow 531. The compute complex 212 of the HW accelerator card may then confirm the instruction and provides an ID that the processor 212 may communicate with to get status updates on the compression by the HW accelerator card 118 as shown by arrow 533. The processor 212 may then request and receive a status of the compression as shown by arrows 535 and 537, respectively. Once a polling request indicates that compression is complete, communication between the processor 112 and HW accelerator card 118 may cease or further tasks may be sent from the processor 112 to the HW accelerator card. Although FIG. 5 illustrates a compression service, the processing performed by the HW accelerator can be any type of operation or combination of operations.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for discovering capabilities of a hardware (HW) accelerator card of a computing device, the method comprising:

opening, by one or more processors of the computing device via a communication interface, a communication channel between the one or more processors and the HW accelerator card of the computing device;

requesting, by the one or more processors via a communication interface and using the communication channel, a listing of acceleration services from the HW accelerator card;

receiving, by the one or more processors via the communication interface and using the communication channel, the listing of acceleration services from the HW accelerator card, wherein the listing of acceleration services is stored within the HW accelerator card, the acceleration services comprising functions and/or capabilities of accelerators on the HW accelerator card; and transmitting, by the one or more processors, a workload instruction to the HW accelerator card, the workload instruction defining a workload for processing by the HW accelerator card that uses one or more of the acceleration services in the listing of acceleration services.

2. The method of claim 1, further comprising requesting status updates from the HW accelerator card during processing of the workload by the HW accelerator card.

3. The method of claim 1, wherein opening the communication channel comprises:

requesting a handle to the HW accelerator card; and
receiving the handle to the HW accelerator card.

4. The method of claim 3, wherein the request for the listing of acceleration services from the HW accelerator card is sent using the handle.

5. The method of claim 3, further comprising closing the handle after receiving a status update indicating completion of the workload by the HW accelerator card.

6. The method of claim 1, wherein a processor of the HW accelerator card retrieves the listing of acceleration services from memory of the HW accelerator card in response to receiving the request from the one or more processors.

7. A system comprising:

a communication interface;

a hardware (HW) accelerator card comprising one or more accelerators and a first memory storing a listing of acceleration services provided by the one or more accelerators; and a processor, in communication with the HW accelerator card via the communication interface, the processor configured to:

open, via the communication interface, a communication channel between the processor and the HW accelerator card;

request, via the communication interface and using the communication channel, the listing of acceleration services from the HW accelerator card;

receive, via the communication interface, the listing of acceleration services from the HW accelerator card, the acceleration services comprising functions and/or capabilities of accelerators on the HW accelerator card; and transmit a workload instruction to the HW accelerator card, the workload instruction defining a workload for processing by the HW accelerator card that uses one or more of the acceleration services in the listing of acceleration services.

8. The system of claim 7, wherein the processor is further configured to request status updates from the HW accelerator card during processing of the workload by the HW accelerator card.

9. The system of claim 8, wherein the processor is further configured to:

request a handle to the hardware HW accelerator card; and
receive the handle.

10. The system of claim 9, wherein the request for the listing of acceleration services from the HW accelerator card is sent using the handle.

11. The system of claim 9, wherein the processor is further configured to close the handle after receiving a status update indicating completion of the workload from the HW accelerator card.

12. The system of claim 7, wherein the HW accelerator card further comprises a compute complex, the compute complex configured to:

retrieve the listing of acceleration services from the first memory in response to receiving the request from the processor.

13. A non-transitory, tangible computer-readable storage medium on which computer-readable instructions of a program are stored, the instructions, when executed by one or more processors, cause the one or more processors to perform a method, the method comprising:

opening, via a communication interface, a communication channel between the one or more processors and a hardware (HW) accelerator card;

request, via the communication interface and using the communication channel, the listing of acceleration services from the HW accelerator card;

receiving, via the communication interface, a listing of acceleration services from the HW accelerator card, wherein the listing of acceleration services is stored within the HW accelerator card, the acceleration services includes functions and/or capabilities of accelerators on the HW accelerator card; and transmitting a workload instruction to the HW accelerator card, the workload instruction defining a workload for processing by the HW accelerator card that uses one or more of the acceleration services in the listing of acceleration services.

14. The non-transitory, tangible computer-readable storage medium of claim 13, the method further comprising requesting status updates from the HW accelerator card during processing of the workload by the HW accelerator card.

15. The non-transitory, tangible computer-readable storage medium of claim 13, the method further comprising:

requesting, from an operating system executing on the one or more computing devices, a handle to a hardware (HW) accelerator card; and receiving the handle to the HW accelerator card.

16. The non-transitory, tangible computer-readable storage medium of claim 15, wherein the request for the listing of acceleration services from the HW accelerator card is sent using the handle.

17. The non-transitory, tangible computer-readable storage medium of claim 16, further comprising closing the handle after receiving a status update indicating completion of the workload instructions.

* * * * *